United States Patent

Stafsudd et al.

[15] 3,701,046
[45] Oct. 24, 1972

[54] GAS LASER MATERIALS AND SYSTEM THEREFOR

[72] Inventors: Oscar M. Stafsudd; Frederik A. Haak, both of Boston, Mass.

[73] Assignee: Hughes Aircraft Company, Culver City, Calif.

[22] Filed: March 5, 1971

[21] Appl. No.: 121,586

Related U.S. Application Data

[63] Continuation of Ser. No. 734,778, June 5, 1968, abandoned.

[52] U.S. Cl. ................................................331/94.5
[51] Int. Cl. ...............................................H01s 3/22
[58] Field of Search..................................331/94.5

[56] References Cited

OTHER PUBLICATIONS

Mathias et al., " Electronics Letters," vol. 1, no. 2, April, 1965, pp. 45– 46.

Gerritsen, " Physics of Quantum Electronics," (Conf. Proc.), McGraw–Hill New York, Jan. 26, 1966, pp. 581– 590.

Flesher, Proc. IEEE, vol. 54, no. 4, April 1966, pp. 543– 546.

Müller et al., (May 1, 1966), " Applied Physics Letters," vol. 8, no. 9, May 1, 1966, pp. 217– 218.

Müller et al., (Feb. 1, 1967) " Applied Physics Letters," 10(3), Feb. 1, 1967, pp. 93– 94.

Lide, Jr. et al., " Applied Physics Letters," vol. 11, no. 12, July 15, 1967, pp. 62– 64.

*Primary Examiner*—William L. Sikes
*Assistant Examiner*—R. J. Webster
*Attorney*—Wm. H. MacAllister, Jr.

[57] ABSTRACT

The present invention provides gas laser materials and a laser system utilizing them to produce laser emissions in the far infrared region between 300 microns and 1,000 microns. Specific materials are selected from the methane and ethane group useful in combination with nitrogen to provide active laser media.

32 Claims, 3 Drawing Figures

PATENTED OCT 24 1972 3,701,046

INVENTORS.
OSCAR M. STAFSUDD
FREDERIK A. HAAK,
BY

Lewis B. Hemphrey

ATTORNEY.

GAS LASER MATERIALS AND SYSTEM THEREFOR

This application is a continuation of Ser. No. 734,778 filed June 5, 1968, now abandoned.

The present invention relates to gas laser materials and a system therefor for producing laser emissions in the far infrared region between 300 microns and 1,000 microns. In particular, the gas laser materials of the present invention encompass materials selected from the methane and ethane group useful in combination with nitrogen to provide a laser system.

Stimulated emission has been obtained from various organic compounds, such as hydrocyanic acid, methyl cyanide, and ethyl cyanide, when subjected to pulsed electrical discharges. In such work, the active species was identified as the "CN" radical.

The present invention departs from the above identification of active species in that the active species is of the form $H_xCN$ or $D_xCN$ where $x \geq 1$, as indicated by experimentation. Since the term "CN" laser has become accepted terminology in the art to describe such laser systems, this term will be employed hereafter for the sake of convenience despite the fact that it is a misnomer. Acetonitrile ($CH_3CN$) was compared with the deuterated compound $CD_3CN$. Separate experiments with both compounds produced stimulated emission with about the same output power but with different wavelengths. $CH_3CN$ was found to produce stimulated emission at all the normal wavelengths associated with the so-called "CN" laser. $CD_3CN$ was found to produce stimulated emission at a different set of wavelengths and none at the normal so-called "CN" wavelengths. In a further experiment, nitrogen gas was admitted into a laser cavity utilizing graphite electrodes and an electrical discharge was used to excite the system. No laser action was produced although a strong red color, which is associated with the CN radial, was obtained. When small amounts of hydrogen were added to the discharge, strong stimulated emission was produced at the normal "CN" wavelengths, carbon being supplied from the graphite electrodes. The use of hydrogen without nitrogen produce no stimulated emission. When deuterium gas was substituted for hydrogen in the above experiments, stimulated emission was observed at the same wavelengths associated with $CD_3CN$. The present invention, therefore, relates to a laser material whose active species are $H_xCN$ and $D_xCN$ which is selected from the group consisting of normal or deuterated methane, ethane, butane, and propane, normal or deuterated methyl, ethyl, N-propyl, and N-butyl ethers, of the elemental form of nitrogen, carbon and hydrogen and of the elemental form of nitrogen, carbon and deuterium. To this, a free nitrogen gas must be added in order to obtain the active species.

It is, therefore, an object of the present invention to provide a family of new gas laser materials.

Another object of the present invention is the provision of a system utilizing such new gas laser materials.

Other aims and objects, as well as a more complete understanding of the present invention, will appear from the following explanation of exemplary embodiments and the accompanying drawings thereof, in which.

Figure 1:
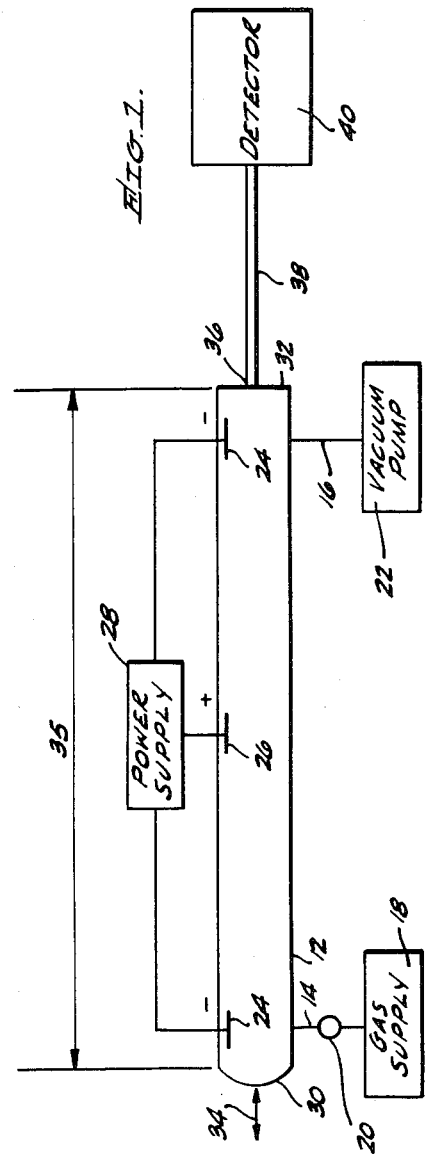
FIG. 1 is a schematic view of a gas discharge tube utilized to produce laser action from the gas laser materials of the present invention.

Accordingly, with reference to FIG. 1, a gas laser system 10 comprises a tube 12 of pyrex glass or other heat resistance material having a gas inlet 14 and a gas outlet 16. A gas supply 18 is connected by inlet 14 to tube 12 by means of a metering valve 20. Outlet 16 is connected to a vacuum pump 22 for exhaust of gas from the tube.

An electrode means, comprising a pair of cathodes 24 and an anode 26, is connected to a power supply 28 for production of an electrical discharge within the tube. Although FIG. 1 depicts the electrode to be at the ends of the tube and the anode to be in the center of the tube, it is possible to place anodes at both ends and a cathode in the center; however, the illustrated arrangement is preferred since this arrangement enables the anode-cathode means to have longer life than in the alternate arrangement. It is also possible to utilize only one anode and one cathode, placed at opposite ends of the tube, although this further arrangement would require a higher voltage rating in power supply 28. The electrodes may be constructed of any suitable material such as stainless steel and graphite. Graphite is essential when the laser system utilizes elemental nitrogen and hydrogen.

A movable concave mirror 30 is placed at one end of tube 12 while a flat mirror 32 is placed at the opposite end of the tube. Mirror 30 is movable as depicted by double headed arrow 34 in order to precisely adjust the effective length 35 of the tube. Flat mirror 32 is provided with a small hole 36 so that the laser waves may exit from the tube as depicted by lines 38. The laser beam is detected by a detector 40. Tube 12 is preferably water cooled in order to maintain the temperature of the apparatus at acceptable levels.

Mirror 30 preferably has a gold reflecting surface and its curvature is such that its focal length is approximately that of the tube. It is in part for this reason that the curved mirror is adjustable. The diameter of tube 12 varies from 2 to 6 inches in order that mirror 30 may be able to function properly in reflecting the laser beam without diffraction losses. Hole 36 is approximately 1 millimeter and is placed centrally of mirror 32.

In operation, gas is caused to flow into tube 12 from supply 18 and is exhausted therefrom by pump 22. At the same time, power supply 28 provides a specified wattage to produce continuous wave laser action in the gasses within the tube and a specified level of joules for pulsed action, as is well-known in the art.

In the below discussion, the tube utilized was 2 meters long and approximately 8 centimeters in diameter. The curved mirror had a gold reflecting surface and the exit hole was approximately 1 millimeter in diameter. The tube was water jacketed and was provided with three electrodes with the discharge distance between the outer electrodes being approximately 180 centimeters. The focal length of the spherical mirror was 250 centimeters ± 2.5 centimeters and the average separation between mirrors was 243 centimeters ±1 centimeter. The cathodes were of stainless steel and were forced-air cooled.

Figure 2:
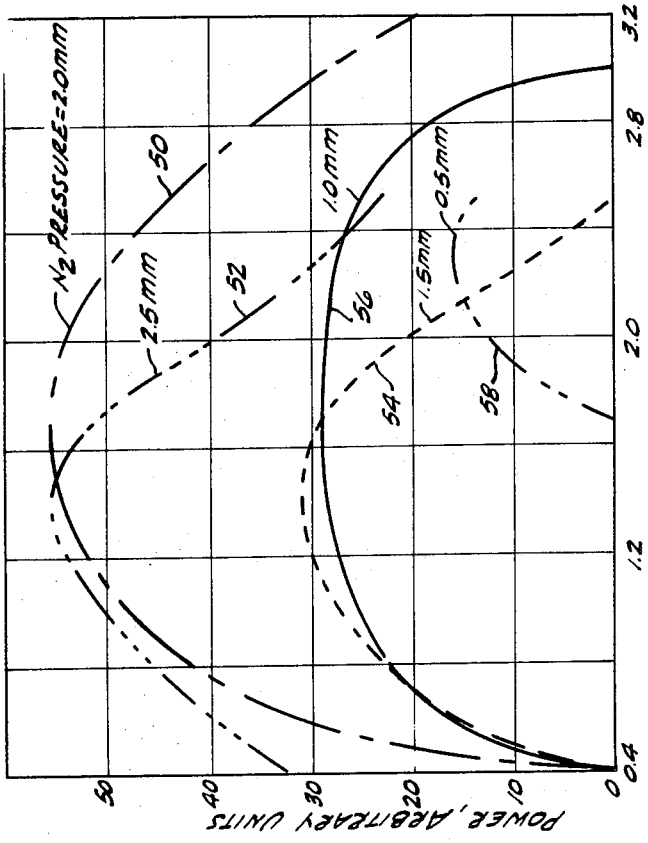
FIG. 2 is a graph depicting laser output in a methane-nitrogen system in terms of power applied versus methane and nitrogen pressure.

When methane was used as a gas in combination with nitrogen, laser at 337 microns, 311 microns, 291 microns, and 281 microns were observed. The strongest line was at 337 microns. As shown in FIG. 2, a nitrogen pressure of 2.0 millimeters Hg, as indicated by line 50, the peak output occurred at approximately 57 millivolts at a pressure of approximately 1.6 to 1.9 millimeters Hg of methane. Greater and lesser methane pressures produced laser outputs at correspondingly lower power inputs. Similar analyses were obtained for nitrogen pressures at 2.5 millimeters Hg (curve 52), 1.5 millimeters Hg nitrogen (curve 54), 1.0 mm Hg of nitrogen (curve 56), and 0.5 mm Hg of nitrogen (curve 58).

Figure 3:
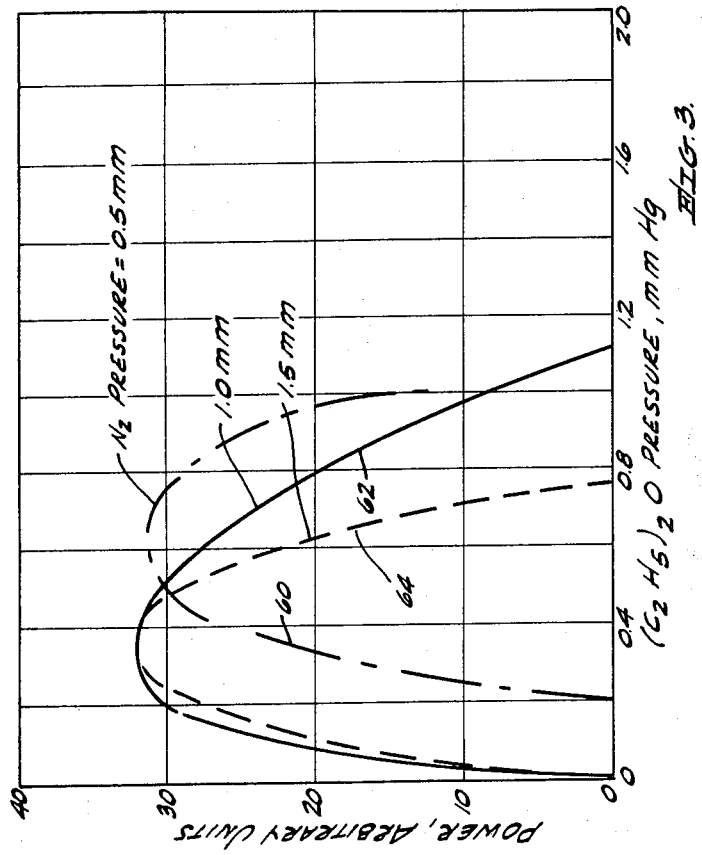
FIG. 3 is a graph of an ethyl ether-nitrogen system in terms of power versus methyl ether and nitrogen pressure.

The various curves for ethyl ether in terms of power output versus pressure under pulsed and direct current discharge conditions is depicted in FIG. 3. The same laser lines were obtained as for the methane system. Curves 60, 62, and 64 resulted from different pressures of nitrogen, respectively, at 0.5 mm Hg, 1.0 mm Hg, and 1.5 mm Hg.

The chart of these two gasses as well as other gasses list the following parameters and results, as follows:

| Laser Gas Materials | Power Input | Output | Laser Lines in Microns |
|---|---|---|---|
| $H_2+N_2+C$* | 1000 | 30 | 337, 311, 291, 281 |
| $CH_4+N_2$ | 1000 | 30 | 337, 311, 291, 281 |
| $(CH_3)_2O+N_2$ | 1000 | 30 | 337, 311, 291, 281 |
| $(C_2H_5)_2O+N_2$ | 1000 | 30 | 337, 311, 291, 281 |
| $(C_3H_7)_2O+N_2$ | 1000 | 30 | 337, 311, 281, 281 C |
| $(C_4H_7)_2O+N_2$ | 800–1000 | 50 | 337, 311, 291, 281 |
| $CD_4+N_2$ | 1000 | 30 | 193.8, 198.8 |
| $(CD_3)CN$ | 1000 | 30 | 193.8, 198.8 |
| $D_2+N_2+C$* | 1000 | 30 | 193.8, 198.8 |

*The carbon was obtained from graphite electrodes and elemental hydrogen or deuterium, and nitrogen were used.

The methane-nitrogen system of the present invention, in particular, operates in an almost completely clean manner with little formation of carbon compound reaction deposits on the tube surface. In addition, very high powers were obtained, in the order of twice that of any other system presently known. Peak powers of approximately 100 watts were obtained on a pulsed basis. The other laser materials of the present invention deposit greater amounts of carbon reaction compounds as they depart further from methane or methyl ether.

The use of water vapor also helps to clean the tube by reacting with some of the gaseous materials which are driven out by the vacuum pump. It was further found that the greater the flow rate of gasses through the tube, the better the output power became; however, an upper limit was found since, if the flow rate were too great, the gases would not remain within the tube a sufficiently long time before they produced laser action.

Although the invention has been described with reference to particular embodiments thereof, it should be realized that various changes and modifications may be made therein without departing from the spirit and scope of the invention.

What is claimed is:

1. A laser material consisting of the group selected from:
   a. nitrogen gas and one of the subgroup selected from normal and deuterated methane;
   b. nitrogen gas, elemental carbon, and one of the subgroup selected from normal and deuterated hydrogen; and
   c. one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso-propyl ether, and N-butyl ether.

2. A laser material as in claim 1 wherein said $H_xCN$ gas is provided with excess free nitrogen.

3. A laser material as in claim 2 wherein the pressure of free nitrogen ranges from approximately 0.5 to 2.5 millimeters mercury.

4. A laser system comprising a laser material a sealed tube provided with electrode means including at least one cathode and one anode and with reflectors positioned adjacent the ends of said tube for stimulating the emission of coherent radiation from said laser material a power supply connected to said electrode means for coupling energy to said electrodes for creating a population inversion in said laser material, said laser material consisting of the group selected from;
   a. nitrogen gas and one of the subgroup selected from normal and deuterated methane;
   b. nitrogen gas, elemental carbon, and one of the subgroup selected from normal and deuterated hydrogen; and
   c. one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, isopropyl ether, and N-butyl ether.

5. A system as in claim 4 wherein said $H_xCN$ gas is provided with excess free nitrogen.

6. A system as in claim 5 wherein laser lines of 291 microns, 281 microns, and 337 microns are obtained when 800 to 1,000 watts of power from said supply is supplied to said electrode means and when the pressure of said free nitrogen ranges from approximately 0.5 to 2.5 millimeters.

7. A system as in claim 5 further including gas supply means connected to one end of said tube and pump means connected to the other end of said tube, said pump means pumping said gasses at a rate of flow to remove tube degrading reaction gasses and to enable laser action.

8. A system as in claim 4 wherein said electrode means consists of graphite to provide the elemental carbon when said normal and deuterated group consists of the combination of elemental carbon and hydrogen.

9. A laser material consisting of nitrogen gas and one of the group selected from normal and deuterated methane.

10. A laser material comprising one of an $H_xCN$ and $D_xCN$ gas ($x \geq 1$) wherein the $H_xC$ and the $D_xC$ are selected from the group consisting of normal and deuterated ethane.

11. A laser material comprising one of an $H_xCN$ and $D_xCN$ gas ($x \geq 1$) wherein the $H_x$ C and the $D_xC$ are selected from the group consisting of normal and deuterated butane.

12. A laser material comprising one of an $H_xCN$ and $D_xCN$ gas ($x \geq 1$) wherein the $H_xC$ and the $D_xC$ are selected from the group consisting of normal and deuterated propane.

13. A laser material comprising one of an $H_xCN$ and $D_xCN$ gas ($x \geq 1$) wherein the $H_xC$ and the $D_xC$ are selected from the group consisting of normal and deuterated methyl ether.

14. A laser material one of an $H_xCN$ and $D_xCN$ gas ($x \geq 1$) wherein the $H_xC$ and the $D_xC$ are selected from the group consisting of normal and deuterated ethyl ether.

15. A laser material comprising one of an $H_xCN$ and $D_xCN$ gas ($x \geq 1$) wherein the $H_xC$ and the $D_xC$ are selected from the group consisting of normal and deuterated N-propyl ether.

16. A laser material comprising one of an $H_xCN$ and $D_xCN$ gas ($x \geq 1$) wherein the $H_xC$ and the $D_xC$ are selected from the group consisting of normal and deuterated iso-propyl ether.

17. A laser material comprising one of an $H_xCN$ and $D_xCN$ gas ($x \geq 1$) wherein the $H_xC$ and the $D_xC$ are selected from the group consisting of normal and deuterated N-butyl ether.

18. A laser material consisting of the combination of nitrogen gas, elemental carbon, and the group selected from normal and deuterated hydrogen.

19. A laser material consisting of the group selected from:
   a. nitrogen gas and one of the subgroup selected from normal and deuterated methane; and
   b. one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso-propyl ether, and N-butyl ether.

20. A laser system comprising a laser material, a sealed tube provided with electrode means including at least one cathode and one anode and with reflectors positioned adjacent the ends of said tube for stimulating the emission of coherent radiation from said laser material, a power supply connected to said electrode means for coupling energy to said electrodes for creating a population inversion in said laser material, said laser material consisting of the group selected from:
   a. nitrogen gas and one of the subgroup selected from normal and deuterated methane; and
   b. one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso1-propyl ether, and N-butyl ether.

21. A laser material consisting of the group selected from:
   a. nitrogen gas, elemental carbon, and one of the subgroup selected from normal and deuterated hydrogen; and
   b. one of an $H_xCN$ and $D_xCN$ gas ($x \geq 1$) wherein the $H_xC$ and the $D_xc$ are selected from the normal and deuterated subgroup consisting of ethane, butane, propane, methyl ether, ethyl ether, N-propyl ether, iso-propyl ether, and N-butyl ether.

22. A laser system comprising a laser material, a sealed tube provided with electrode means including at least one cathode and one anode and with reflectors positioned adjacent the ends of said tube for stimulating the emission of coherent radiation from said laser material, a power supply connected to said electrode means for coupling energy to said electrodes for creating a population inversion in said laser material, said laser material consisting of the group selected from:
   a. nitrogen gas, elemental carbon, and one of the subgroup selected from normal and deuterated hydrogen; and
   b. one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso-propyl ether, and N-butyl ether.

23. A laser material consisting of the group selected from one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso-propyl ether, and N-butyl ether.

24. A laser system comprising a laser material, a sealed tube provided with electrode means including at least one cathode and one anode and with reflectors positioned adjacent the ends of said tube for stimulating the emission of coherent radiation from said laser material, a power supply connected to said electrode means for coupling energy to said electrodes for creating a population inversion in said laser material, said laser material consisting of the group selected from one of an $H_xCN$ and $D_xCN$ gas ($x \geq 1$) wherein the $H_xC$ and the $D_xC$ are selected from the normal and deuterated subgroup consisting of ethane, butane, propane, methyl ether, ethyl ether, N-propyl ether, iso-propyl ether, and N-butyl ether.

25. A laser material as in claim 10 wherein the N of the $H_xCN$ and $D_xCN$ gas consists of nitrogen gas.

26. A laser material as in claim 11 wherein the N of the $H_xCN$ and $D_xCN$ gas consists of nitrogen gas.

27. A laser material as in claim 12 wherein the N of the $H_xCN$ and $D_xCN$ gas consists of nitrogen gas.

28. A laser material as in claim 13 wherein the N of the $H_xCN$ and $D_xCN$ gas consists of nitrogen gas.

29. A laser material as in claim 14 wherein the N of the $H_xCN$ and $D_xCN$ gas consists of nitrogen gas.

30. A laser material as in claim 15 wherein the N of the $H_xCN$ gas consists of nitrogen gas.

31. A laser material as in claim 16 wherein the N of the $H_xCN$ and $D_xCN$ gas consists of nitrogen gas.

32. A laser material as in claim 17 wherein the N of the $H_xCN$ and $D_xCN$ consists of nitrogen gas.

* * * * *

UNITED STATES PATENT OFFICE
CERTIFICATE OF CORRECTION

Patent No. 3,701,046  Dated October 24, 1972

Inventor(s) Oscar M. Stafsudd et al.

It is certified that error appears in the above-identified patent and that said Letters Patent are hereby corrected as shown below:

Column 1, line 37, "radial" should read --radical--;
line 42, "produce" should read --produced--.
Column 2, line 9, "resistance" should read --resistant--.
Column 3, line 2, after "laser" insert --lines--;
line 26, "Input" and "Output" should read --Input-- and --Output--;   (watts)
(mw)
line 31, "337,311,281,281 C" should read --337,311,291,281--;
line 32, "(C$_4$H$_7$])$_2$O+N$_2$" should read --(C$_4$H$_9$)$_2$O+N$_2$--;
line 53, "driven" should read --drawn--;
line 67, "consisting of" should read --selected from--
lines 66 and 67, "selected from" should read --consisting of--
Column 4, line 17, after "a laser material" insert a comma (,);
line 21, after "said laser material" insert a comma (,)
line 26, "consisting of" should read --selected from--
"selected from" should read --consisting of--
line 36, "isopropyl" should read --iso-propyl--;
lines 57 and 58, "one of" should read --a member selected from--
"selected from" should read --consisting of--.
Column 5, line 9, after "material" insert --comprising--;
line 26, after ", and" insert --a member selected from--
lines 26 and 27, "selected from" should read --consisting of--
line 28, "consisting of" should read --selected from--
lines 28 and 29, "selected from" should read --consisting of--
line 45, "consisting of" should read --selected from--
"selected from should read --consisting of--;

UNITED STATES PATENT OFFICE
CERTIFICATE OF CORRECTION

Patent No. 3,701,046　　　　　　　　Dated October 24, 1972

Inventor(s) Oscar M. Stafsudd et al.

It is certified that error appears in the above-identified patent and that said Letters Patent are hereby corrected as shown below:

line 52, "isol-propyl" should read --iso-propyl--;
    line 53, "consisting of" should read --selected from--;
    lines 53 and 54, "selected from" should read --consisting of--.

Column 6, line 13, "consisting of" should read --selected from--
                 "selected from" should read --consisting of--
       line 22, "consisting of" should read --selected from--
       lines 22 and 23, "selected from" should read --consisting of--
       line 36, "consisting of" should read --selected from--
                 "selected from" should read --consisting of--
       line 53, after "$H_xCN$" insert --and $D_xCN$--;
       line 57, after "$D_xCN$" insert --gas--.

This certificate supersedes Certificate of Correction issued September 25, 1973.

Signed and Sealed this

Thirteenth Day of September 1977

[SEAL]

Attest:

RUTH C. MASON　　　　　　　　LUTRELLE F. PARKER
*Attesting Officer*　　　　*Acting Commissioner of Patents and Trademarks*